United States Patent [19]

Kuse et al.

[11] Patent Number: 4,632,867

[45] Date of Patent: Dec. 30, 1986

[54] MAGNETIC RECORDING MEDIUM

[75] Inventors: Sadamu Kuse, Mino; Seigi Kawarai, Ashiya, both of Japan

[73] Assignee: Hitachi Maxell, Ltd., Osaka, Japan

[21] Appl. No.: 752,857

[22] Filed: Jul. 8, 1985

[30] Foreign Application Priority Data

Jul. 9, 1984 [JP] Japan ................... 59-141883

[51] Int. Cl.$^4$ ................................ G11B 5/68
[52] U.S. Cl. ...................... 428/323; 427/131; 428/332; 428/402; 428/694; 428/900
[58] Field of Search .............. 428/402, 408, 694, 403, 428/900, 323, 332; 427/131

[56] References Cited

U.S. PATENT DOCUMENTS

| 4,117,190 | 9/1978 | Akashi et al. | 428/328 |
| 4,310,599 | 1/1982 | Akashi et al. | 428/694 |
| 4,474,843 | 10/1984 | Miyoshi et al. | 428/328 |

*Primary Examiner*—Paul J. Thibodeau
*Attorney, Agent, or Firm*—Birch, Stewart, Kolasch & Birch

[57] ABSTRACT

A magnetic recording medium having an excellent electromagnetic property with a low frictional magnetic layer surface which comprises a base material and a magnetic layer provided thereon, said magnetic layer comprising magnetic powder, a resinous binder and graphitized carbon black powder, optionally with non-graphitized carbon black powder.

8 Claims, No Drawings

MAGNETIC RECORDING MEDIUM

BACKGROUND OF THE INVENTION

The present invention relates to a magnetic recording medium, particularly a magnetic recording tape, comprising a base film, a magnetic layer provided on one surface (i.e. the major or front surface) of the base film and a back coat layer provided on the other surface (i.e. the back surface) of the base film.

In general, a magnetic recording tape comprises a base film and a magnetic layer provided on the major surface of the base film. In order to prevent various problems such as deterioration of the running property and adhesion of dust caused by the electrification of the back surface, a back coat layer of low electrification is usually provided. While such back coat layer is effective in suppressing the electrification, its friction coefficient is higher than that of the back surface itself so that the running property is not significantly improved. Because of this reason, a lubricant is incorporated into the back coat layer so as to lower the friction coefficient.

As the lubricant for the above purpose, there is used a liquid or semi-solid lubricant, such as a fatty acid (e.g. stearic acid, myristic acid) or a fatty acid ester. There is also used a solid lubricant such as graphite powder or molybdenum disulfide powder. However, the use of the liquid or semi-solid lubricant in a large amount often makes the surface of the back coat layer tacky and stains the guide pin of a magnetic recording and reproducing device. Thus, a certain upper limit is present as to the amount of the liquid or semi-solid lubricant to be used, and therefore a satisfactory reduction of the friction coefficient is hardly attained. The use of the solid lubricant does not produce the drawbacks as seen in the use of the liquid or semi-solid lubricant. However, the solid lubricant is required to use in a relatively large amount for attaining a sufficient reduction of the friction coefficient, and therefore the surface smoothness is lost and the electromagnetic characteristics are deteriorated. This is due to the fact that the solid lubricant is usually manufactured through the step of crushing so that its fine particles are hardly obtainable.

In Japanese Patent Publication (unexamined) No. 88307/77, it is described that a graphite-like crystalline sturcture is partly observed in carbon black powder having a specific surface area of more than 700 m$^2$/g (determined by the N$_2$ adsorption method (hereinafter referred to as "BET method")) and a DBP (dibutyl phthalate) oil absorption of more than 300 ml/100 g. Although an attempt was made to use such carbon black powder as the lubricant, its incorporation into the back coat layer did not exert such a desirable lubricating effect as initially expected; i.e. the carbon black powder did not show a sufficient lubricating effect without deterioration of the smoothness.

SUMMARY OF THE INVENTION

Aiming at providing a magnetic recording medium comprising a back coat layer having a low friction coefficient and a good surface smoothness and showing excellent running property, an extensive study has been made. As a result, it has been determined that upon the incorporation of carbon black powder of which each particle is covered by a graphite layer at the surface (hereinafter referred to as "graphitized carbon black powder") into the back coat layer a satisfactory lubricity can be imparted without causing any of the drawbacks as above stated with respect to conventional liquid or semi-solid lubricants as well as conventional solid lubricants.

Quite advantageously, the graphitized carbon black powder can be produced from carbon black powder without any crushing step, and its particle size and distribution can be readily controlled by the appropriate regulation of the atmosphere during the production. Since the graphitized carbon black powder of very fine particle size is readily obtainable, a black coat layer having an appropriately smooth surface can be easily formed with its use. While such a smooth surface is expected to result in an increase of friction, the lubricity inherent to the graphitized surface is sufficient to overcome the increase of friction due to the surface smoothness. Thus, the back coat layer incorporated with the graphited carbon black powder is provided with satisfactory smoonthness and lubricity.

DETAILED DESCRIPTION

According to the present invention, there is provided a magnetic recording medium which comprises a base film, a magnetic layer provided on one surface (i.e. the major surface) of the base film and a back coat layer provided on the other surface (i.e. the back surface) of the base film, the back coat layer comprising a binder and non-magnetic powder dispersed therein, characterized in that the non-magnetic powder comprises graphitized carbon black powder. Such a magnetic recording medium of the invention shows low friction with the appropriate smoothness.

The graphitized carbon black powder to be incorporated in the back coat layer according to the invention comprises particles of which each is an integral body of a core portion and a graphitized surface layer around the core portion and can be produced by subjecting carbon black powder to heat treatment at a high temperature such as 2,700° to 3,000° C. As the starting carbon black powder, there may be used fine particles of carbon obtained by incomplete combustion or thermal decomposition of hydrocarbons such as natural gas or petroleum. Each particle of the carbon black powder is an aggregate of crystallites wherein several carbonaceous layer planes are stacked on each other almost in parallel with intervals of about 3.5 Å, each carbonaceous layer plane consisting of about 90 carbon atoms arranged in hexagonal rings. The microstructure of each particle may be considered to comprise a core portion wherein crystallites are arranged irregularly and a surface portion wherein crystallites are arranged in parallel or almost parallel to the surface. The angular displacement of one layer with respect to another is random and the layers overlap one another irregularly, this being termed turbostatic structure.

Heat treatment of the starting carbon black powder results in a decrease in the distance between the carbonaceous layer planes and growth of the crystallites, whereby the arrangement of carbonaceous layer planes at the surface of each particle changes to make a shell-like graphitized structure. Thus, each particle of the graphitized carbon black powder has a concentric graphite layer structure similar to the crystalline structure of a graphite particle at the surface and therefore can exert the necessary lubricity in all directions. Accordingly, its incorporation into the back coat layer produces a significant reduction in friction.

The graphitized carbon black powder is desired to have an average particle size of about 20 to 200 m$\mu$, preferably from about 50 to 100 $\mu$m. Further, each particle of the graphitized carbon black is preferred to have a graphitized layer of about 5 to 50 % in thickness based on the particle size. When the particle size is too small, the effect of reducing the friction is not sufficient. When too large, the surface of the back coat layer is made rough, and its smoothness is lowered. For preparation of the desirable graphitized carbon black powder, there may be used as the starting material carbon black powder having an average particle size of about 25 to 220 m$\mu$ with a suitable specific surface area and an appropriate DBP oil absorption. In the case of the average particle size being about 20 m$\mu$, for instance, there may be used a particle having a specific surface area of not more than about 150 m$^2$/g (determined by the BET method) and a DBP oil absorption of not more than about 130 ml/100 g. In the case of the average particle size being about 50 m$\mu$, the particle having a specific surface area of not more than about 70 m$^2$/g (determined by the BET method) and a DBP oil absorption of not more than about 100 ml/100 g may be used. In the case of the average particle size being about 100 m$\mu$ or more, the particle having a specific surface area of not more than about 30 m$^2$/g (determined by the BET method) and a DBP oil absorption of not more than about 70 ml/100 g may be employed. Specific examples of the graphitized carbon black powder which are commercially available are Nos. 4010 and 4040 (manufactured by Mitsubishi Chemical Industries Ltd.), Spheron 6, Stering R and Stering FT (manufactured by Cabot Corporation), etc.

The magnetic recording medium of the invention may be prepared, for instance, by applying a magnetic coating composition comprising magnetic powder and a binder dispersed or dissolved in a liquid medium onto one surface (i.e. the major surface) of a base film such as a polyester (e.g. polyethylene terephthalate) film usually having a thickness of about 4 to 15$\mu$, followed by drying to form a magnetic layer usually having a thickness of about 1.5 to 10$\mu$. Onto the other surface (i.e. the back surface) of the base film, a non-magnetic coating composition comprising graphitized carbon black powder and a binder dispersed or dissolved in a liquid medium is applied, followed by drying to provide a back coat layer usually having a thickness of about 0.3 to 2$\mu$.

The magnetic coating composition comprises magnetic powder and a binder therefor dispersed or dissolved in a liquid medium (e.g. toluene, cyclohexanone, methylethylketone). As the magnetic powder, there may be used gamma-Fe$_2$O$_3$ powder or intermediary oxides thereto, Fe$_3$O$_4$ powder or intermediary oxides thereto, Co-containing gamma-Fe$_2$O$_3$ powder or intermediary oxides thereto, CrO$_2$ powder, Sb-containing CrO$_2$ poweder, Fe powder, Co powder, Fe-Ni powder, Fe-Co-Ni powder, barium-ferrite powder, etc. These magnetic powders have usually an average particle size (longer) of about 0.05 to 1$\mu$. Examples of the binder are polyvinyl chloride, vinyl chloride/vinyl acetate copolymer, polybutyral resin acrylic resin, epoxy resin, phenol resin, polyol resin, amino resin, synthetic rubber resin, cellulose resin, isocyanate compounds, etc. Any other additive such as abrasive particles, an antistatic agent and a visocisty controlling agent may be optionally incorporated into the magnetic coating composition.

The non-magnetic coating composition comprises graphitized carbon black powder and a binder therefor dispersed or dissolved in a liquid medium (e.g. toluene, cyclohexanone, methylethylketone). In addition to the above components, the coating composition comprises usually a reinforcing inorganic powder (e.g. barium sulfate, red iron oxide, calcium carbonate, carbon black, alumina, chromium oxide, titanium oxide). The amount of the graphitized carbon black powder in the coating composition may be usually from about 1 to 50 % by weight, preferably from about 5 to 30 % by weight on the basis of the combined weight of the graphitized carbon black powder and the reinforcing inorganic powder. When the amount of the graphitized carbon black powder is too small, the friction coefficient of the back coat layer is not sufficiently lowered. When the amount is too large, the dispersibility in the coating composition is deteriorated, and the surface smoothness of the back coat layer is lost.

The non-magnetic coating composition may also comprise optionally a fatty acid (e.g. stearic acid, myristic acid) or a fatty acid ester. Its amount is to be the one neither making the resulting back coat layer tacky nor staining the guide pin and may be usually from about 1 to 10 parts by weight to 100 parts by weight based on the combined weight of the graphitized carbon black powder and the reinforcing inorganic powder.

The non-magnetic coating composition may further comprise a conventional antistatic agent so as to suppress the electrification more efficiently. Such antistatic agent is not limitative but preferred to be the one having an excellent antistatic property without deterioration of the surface smoothness and without causing any unfavorable influence to the lubricity of the graphitized carbon black powder. Particularly preferred is an electroconductive carbon black powder having a specific surface area of not more than about 500 m$^2$/g (determined by the BET method), a DBP oil adsorption of about 100 to 200 ml/100 g and a volatile component content of not more than about 3 % by weight. When the specific surface area is too large, the electrification of the back coat layer become small but the surface smoothness of the back coat layer is deteriorated. When the DBP oil absorption is too small, reduction of the electrification is not efficient. When too large, the surface smoothness is deteriorated. The volatile components originate from the oxygen-containing groups or structures such as carboxyl, quinone, phenol and lactone at the surface of the particles. When their content is larger, the compatibility with the binder is enhanced. In order to lower the electrification, however, the number of oxygen-containing groups or structures is preferred to be smaller. Examples of the electroconductive carbon black powder as commercially available are "No. 3300B" (manufactured by Mitsubishi Chemical Industries Ltd.), "Conductex 950 BEAD" (manufactured by Columbia Carbon Co. Ltd.), "Vulcan XC-72" (manufactured by Cabot Corporation, etc. The amount of the electroconductive carbon black powder in the non-magnetic coating composition may usually range from about 9 to 50 % by weight, preferably from about 15 to 30 % by weight, based on the combined weight of the graphitized carbon black powder and the electroconductive carbon black powder. The combined amount of the graphitized carbon black powder and the electroconductive carbon black powder may be usually from about 10 to 90 % by weight, preferably from about 20 to 60 % by weight based on the combined weight of the three reinforcing inorganic powder and the electroconductive carbon black powder. When the amount of the electroconductive carbon powder is too large, the proportion of the graphitized carbon black powder is lowered so that reduction of the friction coefficient becomes insufficient. When it is too small, the electrification of the back coat layer are not satisfactorily reduced.

As understood from the above, the back coat layer in the magnetic recording medium of the instant invention is characteristic in comprising the graphitized carbon black powder and shows a superior lubricity to conventional back coat layers comprising graphite powder as a solid lubricant. Thus, the back coat layer has a low friction coefficient. Since the graphitized carbon black powder comprises very fine particles, the surface smoothness of the back coat layer can be maintained at an appropriate level. Accordingly, the magnetic recording medium has excellent running characteristics. When the specific electroconductive carbon black powder is incorporated into the back coat layer together with the graphitized carbon black powder, the back coat layer is provided with an enhanced antistatic property with a lower friction coefficient and better surface smoothness. Advantageously, the durability of the back coat layer is not deteriorated by the incorporation of the components therein.

PREFERRED EMBODIMENTS

Practical and presently preferred embodiments of the invention are illustratively shown in the following Examples wherein part(s) and % are by weight unless otherwise indicated.

EXAMPLE 1

| Materials | Part(s) |
| --- | --- |
| Co—containing gamma-$Fe_2O_3$ powder | 100 |
| alpha-$Fe_2O_3$ powder | 4 |
| Carbon black powder | 2 |
| Cellulose resin ("Nitrocellulose HIG 1" manufactured by Asahi Chemical Industries Ltd.) | 13 |
| Polyurethane resin ("Pandex T-5201" manufactured by Dainippon Ink Co., Ltd.) | 15 |
| Cyclohexanone | 70 |
| Methylisobutylketone | 70 |
| Toluene | 70 |

The above materials were mixed together and dispersed in a ball mill for 50 hours, and an isocyanate compound ("Desmodur L" manufactured by Bayer AG) (5 parts) was added thereto. The resultant mixture was stirred for 1 hour to give a magnetic coating composition.

| Materials | Part(s) |
| --- | --- |
| Barium sulfate | 60 |
| Red iron oxide powder | 10 |
| Graphitized carbon black powder ("4010 BS" manufactured by Mitsubishi Chemical Industries Ltd.; average particle size, 80 m$\mu$) | 30 |
| Cellulose resin ("Nitrocellulose HIG 1") | 22 |
| Polyurethane resin ("Pandex T-5201") | 13 |
| Cyclohexanone | 63 |
| Methylisobutylketone | 63 |
| Toluene | 63 |

The above materials were mixed together and dispersed in a ball mill for 50 hours, and an isocyanate compound ("Desmodur L") (9 parts) was added thereto. The resultant mixture was stirred for 1 hour to give a non-magnetic coating composition.

The magnetic coating composition was applied onto one surface (i.e. the major surface) of a polyethylene terephthalate film of 15$\mu$ in thickness, followed by drying to make a magnetic layer of about 5$\mu$ in thickness. On the other surface (i.e. the back surface) of the polyethylene terephthalate film, the non-magnetic coating composition was applied, followed by drying to make a back coat layer of about 1$\mu$ in thickness. After calendering treatment, the resultant film was slit in a ½ inch width to give a magnetic recording tape.

EXAMPLE 2

In the same manner as in Example 1 but changing the amount of the graphitized carbon black powder in the non-magnetic coating composition to 10 parts and incorporating electroconductive carbon black powder ("No. 3300BS" manufactured by Mitsubishi Chemical Industries Ltd.; specific surface area (determined by the BET method), 110 m$^2$/g; DPB oil absorption, 126 ml/100 g; volatile content, 1.7 %) (20 parts), there was prepared a magnetic recording tape.

COMPARTIVE EXAMPLE 1

In the same manner as in Example 1 but using carbon black powder ("Mogul L" manufactured by Carbot Corporation; average particle size, 24 m$\mu$) (30 parts) in place of the graphitized carbon black powder in the non-magnetic coating composition, there was prepared a magnetic recording tape.

COMPARATIVE EXAMPLE 2

In the same manner as in Example 1 but using graphite powder ("CSSP" manufactured by Nippon Graphite Co.; average particle size, 1,000 m$\mu$) (30 parts) in place of graphitized carbon black powder in the non-magnetic coating composition, there was prepared a magnetic recording tape.

With respect to the magnetic recording tapes as prepared in Examples 1 and 2 and Comparative Examples 1 and 2, the surface smoothness, friction coefficient and surface electric resistance of the back coat layer were examined in the following procedures:

Surface smoothness:

The average surface roughness (C.L.A. value) of the back coat layer was measured by the aid of a needle contact roughness meter under the following conditions: needle speed, 0.06 cm/sec; cut-off, 0.08 mm. The resulting C.L.A. value was introduced into the following formula to calculate the relative value, on which the surface smoothness was evaluated:

$$\text{Relative value} = 10 \log \frac{\text{C.L.A value of magnetic recording tape in Example 1}}{\text{C.L.A value of magnetic recording tape in other Example}}$$

Friction coefficient:

A SUS 304 made cylinder having a diameter of 4 mm and a surface roughness of 0.2 S was suspended horizontally, and a magnetic recording tape was vertically hung around the cylinder. While charging a 30 g load onto one end of the tape, the other end was drawn in a horizontal direction with a speed of 1.4 cm/sec to determine the stress (T), which was introduced into the following formula to obtain the friction coefficient (u):

$$u = (2/\pi) \ln (T/30)$$

Surface electric resistance:

A direct current voltage of 500 V was applied to electrodes oppositely arranged with a distance of 1.25 cm. Over the electrodes, the magnetic recording tape was hung over so as to directly contact with the electrodes. The current value (I) on application of a tension of 20 g onto the magnetic recording tape was measured, from which the surface electric resistance (R) was calculated according to the formula: $R = 500/I$.

The results are shown in the following table.

TABLE

|  | Surface smoothness | Friction coefficient | Surface electric resistance ($\Omega$/SQR) |
|---|---|---|---|
| Example |  |  |  |
| 1 | 0 | 0.19 | 37 × 10$^7$ |
| 2 | +0.5 | 0.20 | 2.5 × 10$^7$ |
| Comparative Example |  |  |  |
| 1 | −0.1 | 0.25 | 6.7 × 10$^7$ |
| 2 | −2.5 | 0.19 | 23 × 10$^7$ |

Also, the magnetic recording tapes are obtained in Examples 1 and 2 were examined on the durability of the back coat layer in the following manner and evaluated "excellent": the magnetic recording tapes was applied to a SUS 304 made cylinder of 10 mm in diameter having a surface roughness of 0.5 S so as to contact the back coat layer onto the cylinder; the magentic recording tape was subjected to running slidably on the cylinder rotating at 1200 r.p.m. for 5 minutes under a load of 5 to 20 g; then, observation was made on the weight of the load on which hurt was observed on the back coat layer or stain was produced on the cylinder; larger load was taken as better durability.

As understood from the above results, the magnetic recording tape of the invention (Examples 1 and 2) has a back coat layer comprising graphitized carbon black powder, and its friction coefficient at the back coat layer is so low as in the magnetic recording tape having a back coat layer comprising conventional graphite powder (Comparative Example 2). Yet, the former maintains an appropriate surface smoothness since the graphitized carbon black powder consists of finer particles, while the latter does not. Accordingly, the magnetic recording tape of the invention shows good running characteristics. In the magnetic recording tape comprising conventional carbon black powder (Comparative Example 1), the surface smoothness at the back coat layer is maintained appropriately but the friction coefficient is not sufficiently reduced.

In case of the magnetic recording tape comprising graphitized carbon black powder and electroconductive carbon black in combination in the back coat layer (Example 2), the friction coefficient is sufficiently low, the surface smoothness is good and the surface electric resistance is more lowered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium which comprises a base film having a front and back surface, a magnetic layer provided on said front surface of said base film and a back coat layer provided on said back surface of said base film, said back coat layer comprising graphitized carbon black powder having an average particle size of from 20 to 200 m$\mu$ and a binder therefor said graphitized carbon black comprising particles having an integral core portion and a graphitized surface layer around said core portion, the thickness of said graphitized layer being from 5 to 50 % of the particle size.

2. The magnetic recording medium according to claim 1, wherein said back coat layer further comprises a reinforcing inorganic powder said graphitized carbon black powder being contained in said back coat layer in an amount of from 1 to 50 % by weight based on the combined weight of the graphitized carbon black powder and the reinforcing inorganic powder.

3. The magnetic recording medium according to claim 2, wherein the graphitized carbon black powder is contained in said back coat layer in an amount of from 5 to 30 % by weight based on the combined weight of the graphitized carbon black powder and the reinforcing inorganic powder.

4. The magnetic recording medium according claim 1, wherein the back coat layer further comprises a electroconductive carbon black powder having a specific surface area of not more than 500 m$^2$/g, a DBP oil absorption of about 100 to 200 ml/100 g and a volatile content of not more than about 3 % by weight.

5. The magnetic recording medium according to claim 4, wherein the electroconductive carbon black powder is contained in the back coat layer in an amount of from about 9 to 50 % by weight based on the combined weight of the graphitized carbon black powder, and the electroconductive carbon black powder.

6. The magnetic recording medium according to claim 2, wherein the back coat layer further comprises a fatty acid or a fatty acid ester.

7. The magnetic recording medium according to claim 6, wherein said fatty acid or fatty acid ester is contained in the back coat layer in an amount of 1 to 10 parts by weight to 100 parts by weight of the combined amount of the graphitized carbon black powder and the reinforcing inorganic powder.

8. The magnetic recording medium according to claim 1, wherein the back coat layer has a thickness of from about 0.3 to 2$\mu$.

* * * * *